(12) United States Patent
Williams

(10) Patent No.: US 6,668,861 B2
(45) Date of Patent: Dec. 30, 2003

(54) POPPET VALVE HAVING AN IMPROVED VALVE SEAT

(75) Inventor: Kevin C. Williams, Wixom, MI (US)

(73) Assignee: MAC Valves, Inc., Wixom, MI (US)

(*) Notice: Subject to any disclaimer, the term of this patent is extended or adjusted under 35 U.S.C. 154(b) by 0 days.

(21) Appl. No.: 10/072,061

(22) Filed: Feb. 8, 2002

(65) Prior Publication Data

US 2003/0150498 A1 Aug. 14, 2003

(51) Int. Cl.⁷ .............................. F16B 13/044; F16K 1/38
(52) U.S. Cl. .............................. 137/625.65; 137/625.27; 137/625.5; 251/333
(58) Field of Search .................... 137/625.27, 625.5, 137/625.65; 251/333

(56) References Cited

U.S. PATENT DOCUMENTS

| | | | | |
|---|---|---|---|---|
| 3,202,182 A | * | 8/1965 | Haviland | 137/625.27 |
| 3,244,193 A | * | 4/1966 | Loveless | 137/625.27 |
| 3,510,103 A | * | 5/1970 | Carsello | 251/333 |
| 3,538,954 A | | 11/1970 | Fagerlie et al. | 137/625.65 |
| 3,762,443 A | * | 10/1973 | Sorenson | 137/625.66 |
| 3,884,266 A | * | 5/1975 | Kondo | 137/625.27 |
| 4,298,027 A | | 11/1981 | Neff | 137/625.65 |
| 4,407,323 A | | 10/1983 | Neff | 137/454.2 |
| 4,438,418 A | | 3/1984 | Neff | 335/255 |
| 4,574,844 A | | 3/1986 | Neff et al. | 137/625.65 |
| 4,610,424 A | * | 9/1986 | Koppers et al. | 251/333 |
| 4,726,398 A | * | 2/1988 | Barree | 137/625.5 |
| 4,842,246 A | * | 6/1989 | Floren et al. | 251/333 |
| 4,880,033 A | | 11/1989 | Neff | 137/625.65 |
| 5,092,365 A | | 3/1992 | Neff | 137/625.65 |
| 5,136,774 A | | 8/1992 | Neff | 29/602.1 |
| 5,211,198 A | * | 5/1993 | Tinholt | 137/625.27 |
| 6,192,937 B1 | | 2/2001 | Fagerlie et al. | 137/625.65 |

* cited by examiner

*Primary Examiner*—Gerald A. Michalsky
(74) *Attorney, Agent, or Firm*—Bliss McGlynn, P.C.

(57) ABSTRACT

A pneumatic valve assembly including a valve body having an inlet port in fluid communication with a source of pressurized air and a valve bore extending axially within the valve body with a valve member movable between predetermined positions within the valve bore. The valve member selectively movable to direct a flow of pressurized air from the inlet port through the valve bore to an outlet port. A valve element is disposed upon the valve member having an angular valve sealing surface, and a valve seat is defined in the valve bore formed at an oblique angle to provide a sealing contact with the valve sealing surface when the valve member is in a closed position thereby interrupting said flow of pressurized air.

12 Claims, 6 Drawing Sheets

POPPET VALVE HAVING AN IMPROVED VALVE SEAT

BACKGROUND OF THE INVENTION

1. Field of the Invention

The invention relates, generally, to pneumatic valve assemblies and, more specifically, to a poppet valve having an improved valve seat.

2. Description of the Related Art

Pneumatic valve assemblies are well known in the art for controlling the flow of pressurized air to and from various pneumatically actuated devices such as linear actuators, rotary actuators, air outlets or any other pneumatic device or application requiring precise control of operating air. One type of pneumatic valve currently employed in numerous applications in the related art is generally known as a poppet valve. Poppet valves find particular use, for example, in connection with pilot operated pneumatic valves as a part of an overall fluid powered system. One common poppet valve arrangement includes a valve member movably supported within a valve body between predetermined positions. These positions are typically defined by the placement of the valve seats within the valve bore. The valve member has valve elements that engage the seats. The valve member is moved between the predetermined positions by one or more actuators. Typically, at least one of the actuators includes an electromechanical device, such as a solenoid, that moves the valve member in one direction. The poppet valve assembly may include a biasing member, such as a coiled spring, or even another electromechanical actuating device that moves the valve member in the opposite direction. In this way, the flow of pneumatic pressure within the valve is controlled between various ports formed in the valve body.

Depending on how the valve body is configured internally, the valve may be constructed in either a "normally open" or a "normally closed" configuration, in reference to the initial state of the flow passage from the inlet port to the outlet port of the valve assembly. Additionally, there are known valve assemblies having two, three, or four-way valve flow paths, which can provide multiple internal pneumatic flow paths between a number of inlet and outlet ports. This allows the valve body to be configured to provide some ports as "normally open" and some as "normally closed", depending on the application. Thus, the two, three, or four-way valve assemblies can concomitantly open and close a number of inlet and outlet ports when activating the valve member.

Valve assemblies of this type are employed in a wide variety of manufacturing and process environments where repeatable and very fast response times are desired. More specifically, as noted above, poppet valves currently known in the related art may be used to pilot or control the flow of pneumatic pressure within a main spool valve. However, those having ordinary skill in the art will appreciate from the description that follows that the present invention is not limited in any way to its use as a pilot valve.

In any event, as the technology for these valves has advanced, there has been an increase in the demand for physically smaller valves, which are desired for their ability to be placed in ever tightening work spaces, closer and closer to the active pneumatic devices. Over the years, there have been a number of improvements in this field, which have facilitated high flow rates and repeatable, fast response times in relatively small valves. Yet, as faster and smaller valves have evolved, certain limitations and drawbacks of conventional valve assemblies relating to life cycle durability, repeatability, and valve accuracy have become apparent. Certain high-speed manufacturing and process environments perform repetitive pneumatically driven operations in extremely high numbers over a relatively short period of time. For example, over the course of a year, many of the above-mentioned applications require that these types of pneumatic valves perform literally billions of repetitive actuations while maintaining their original accuracy and sealing properties.

Typical valve assemblies currently employed in the related art are subject to wear and durability limitations and display distinct disadvantages when used in rigorous environments that require high-speed, and high-repetition valve operation. One important factor for maintaining valve assembly operating performance while providing high numbers of repetitive valve actuations lies in maintaining an accurate and consistent valve stroke within the valve body. Any increase in stroke will alter the timing of the valve actuation and increases detrimental internal forces.

One consideration to maintaining a consistent stroke and thereby valve longevity is the nature of the valve seat and valve member interaction. Valve seats commonly employed in the related art typically include a square cut or 90° corner surface. The corresponding valve element usually includes a relatively conical or angularly-formed valve sealing surface. Most often, the valve element is over-molded, or encapsulated, with a resilient material to improve the sealing effect and provide a slight cushioning of the valve member as it interacts with the squared valve seat. The square cut 90° corner of the valve seat can penetrate deep into the poppet valve element during valve operation. As it penetrates, the force being applied to the valve element is spread out across the valve-sealing surface. This sealing interaction initially tends to create a good seal as the over-molded material on the sealing surface of the valve element deflects inwardly slightly as it rests against the edge of the seat thereby creating a ring seal about the seat. However, this sealing effect creates wear as the valve is repetitively activated by causing the sealing material to be repetitively deformed and ultimately damaged, for example by being cut as the valve member moves to its seated position against the valve seat during each and every valve closing event.

As the sealing material begins to permanently deform and then finally cut, the actuator must make a longer and longer stroke to seal the valve. This minimal, yet critical, on going lengthening of the valve stroke introduces a dynamic change to the timing of the valve actuation, which degrades the operation being performed. Changes in the timing of the valve actuation due to changes in the valve stroke translates into process inaccuracies and inconsistencies that ultimately require valve replacement. Secondly, the deforming and cutting of the valve sealing material may cause leakage and often introduces pieces of the sealing material into the downstream pneumatic flow path.

An additional disadvantage to conventional valves becomes evident when analyzing the actuator structure of the typical valve assembly. Typical electromechanical actuated valve assemblies include solenoids that utilize a floating, or moveable armature. A slight gap is required between the armature and the pole piece. This allows the armature to slideably move, or float, within the actuator while moving the valve member. An armature biasing member, which may sometimes include a lost-motion biasing function, is often employed in this environment. This armature biasing member works in conjunction with the valve biasing member, so that both the valve member and the armature are fully returned to their original positions. This arrangement helps to ensure a consistent stroke length.

The floating armature and lost-motion biasing cause little problem by themselves. However, when the valve stroke length grows due to degradation of the valve seat as described above, the gap built into the actuating assembly cannot accommodate the longer stroke length and the armature will begin to strike the valve body or the pole piece each time the actuator energizes the armature. This causes a "hammer and anvil" effect between the individual components, damaging them and sometimes hammering off small particles that become introduced into the valve body and the pneumatic flow path. These conditions lead to an increase in rapid valve wear and further shorten the life span of the valve assembly. A shorter life span of the valve assembly results in repeated replacement of these valve assemblies when they are used in high-speed and high-repetition manufacturing and processing environments.

Thus, there remains a need in the art for a pneumatic valve that overcomes these deficiencies and provides the longevity and life cycle accuracy required for use in applications that require a relatively large number of high-speed repetitions. In addition, there remains a need in the art for pneumatic valves that can withstand the rigors of these severe environmental conditions while providing long life, good sealing properties throughout its useful life with consistent accuracy and little or no increase in valve stroke.

SUMMARY OF THE INVENTION

The present invention overcomes the disadvantages and drawbacks of the conventional related art by providing a pneumatic valve assembly including a valve body having a pressurized air supply inlet port in fluid communication with a source of pressurized air, a valve bore extending axially within the valve body and a valve member movably supported within the valve bore between predetermined positions to selectively direct a flow of pressurized air from the inlet port through the valve bore to at least one outlet port. The valve assembly further includes an at least one valve element disposed upon the valve member, and having an angular valve sealing surface. At least one valve seat is defined in the valve bore. The valve seat is formed at an angle oblique to the valve bore and adapted to provide a sealing contact with the valve sealing surface of the valve element when the valve member is in a closed position, thereby interrupting the flow of pressurized air.

Due to the angular interaction of the sealing surfaces of the valve elements with the valve seats, the valve seat provides an initial line contact that can become a surface sealing contact that creates the desired seal without having a valve sealing surface that must rest against the edge, or corner, of a square faced valve seat. The angular surface-to-surface seal of the valve seat to the valve element in the present invention minimizes the deflection of the resilient material over-molded on the valve element as it interacts with the valve seat. Therefore, the wear that affects the conventional valve art by the sealing material being repetitively deformed and ultimately cut as the valve member moves to its seated position against the square valve seat during each and every valve closing event is eliminated. This also prevents the undesirable and damaging effects of valve stroke lengthening that occurs in conventional valve assemblies. Therefore, valve timing and accuracy is maintained and the system processes that the valve assembly of the present invention controls remains consistent and reliable. Additionally, valve leakage and particle introduction into the downstream pneumatic flow path caused by the deformation and cutting of the valve sealing material of a conventional valve assembly is also eliminated.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENT(S)

Figure 1:
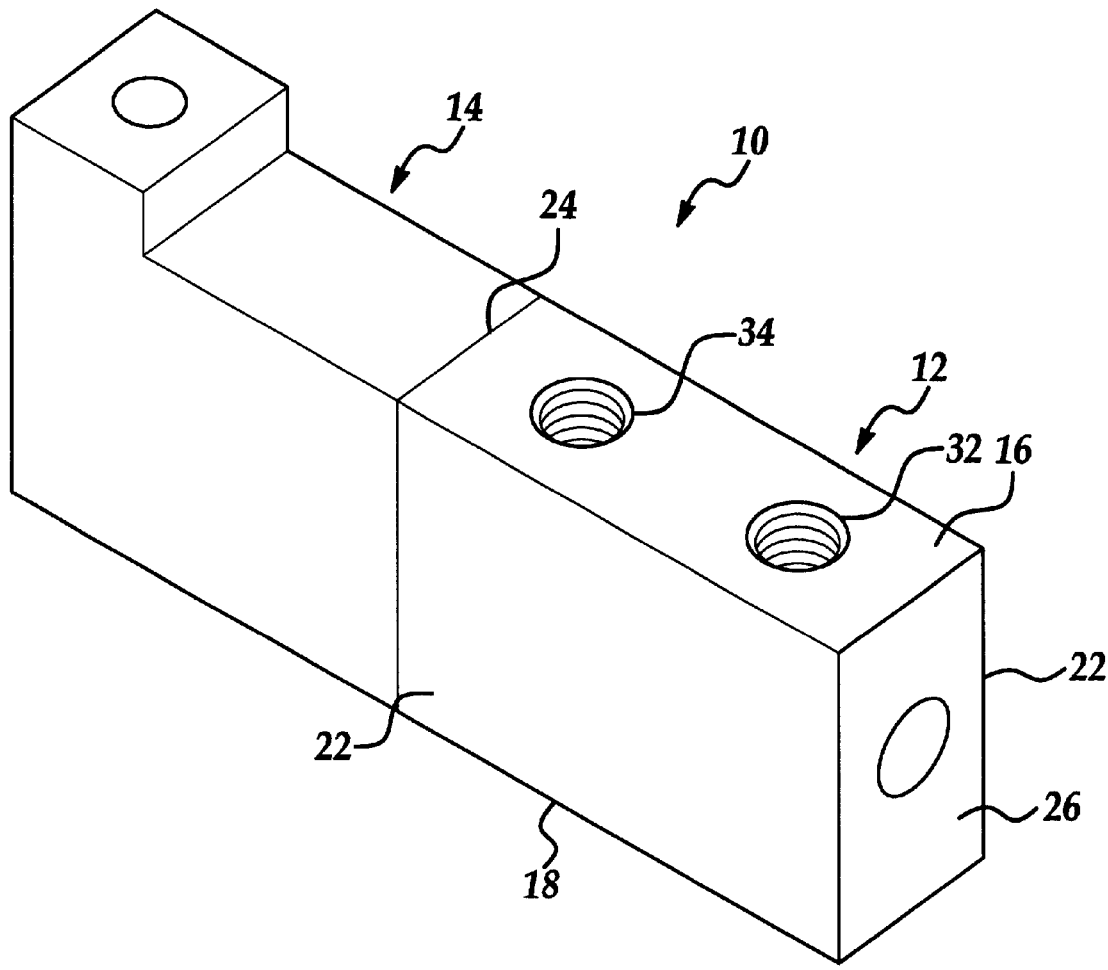
FIG. 1 is a perspective view of the valve assembly of the present invention.
Figure 5:
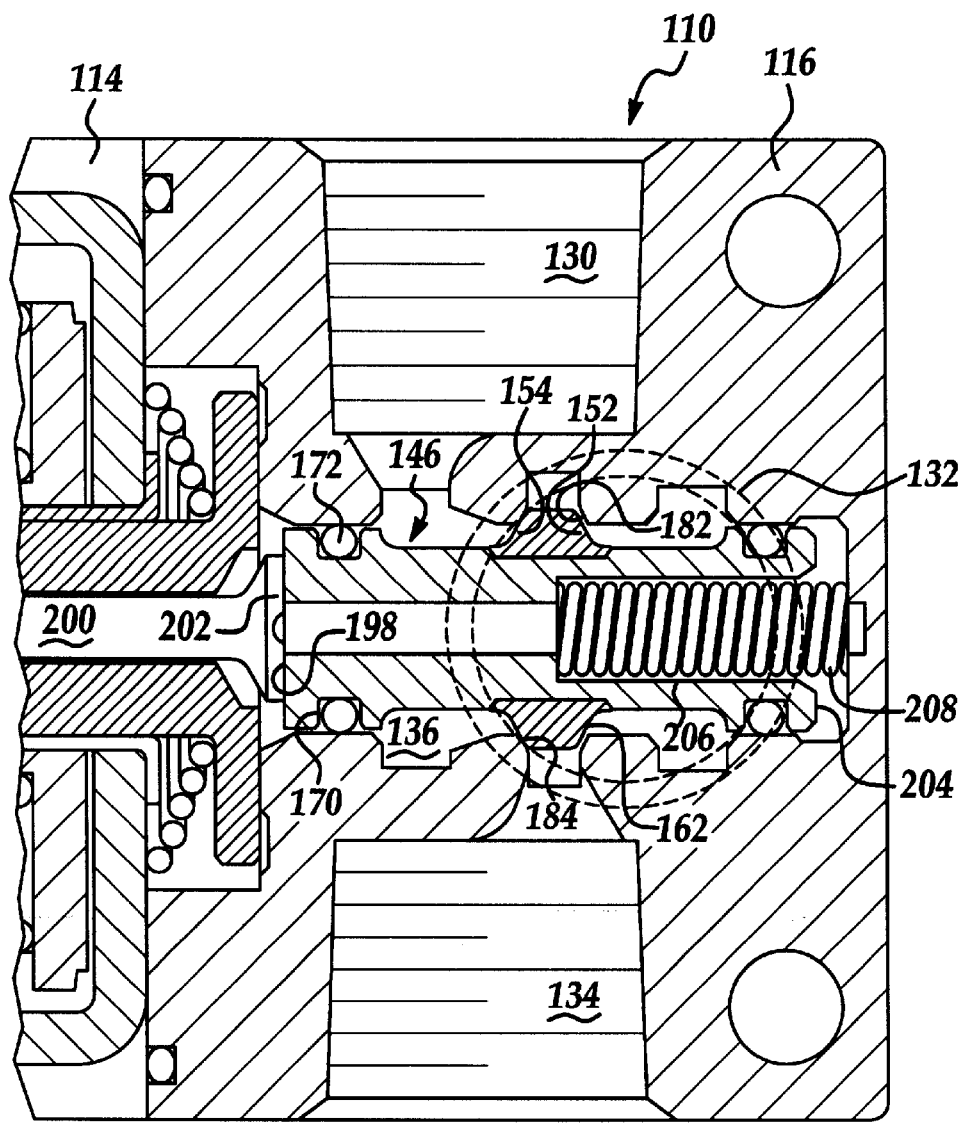
FIG. 5 is a cross-sectional side view of another valve assembly illustrating a three-way valve configuration including the features of the present invention with the position of the valve member when the solenoid is de-energized.

Referring now to the figures where like numerals are used to designate like structure throughout the drawings, a pneumatic valve assembly of the present invention is generally indicated at 10. As shown in FIG. 1, the pneumatic valve assembly includes a valve body 12 and an electromagnetic actuator assembly, such as a solenoid, generally indicated at 14 and mounted to the valve body 12. The valve body 12 has a thin rectangular shape defining top and bottom surfaces 16, 18, respectively, a pair of opposed side surfaces 20, 22 extending between the top and bottom surfaces 16 and 18 and end surfaces 24, 26. The actuator assembly 14 is mounted to the end surface 24 of the valve body 12. The actuator of the present invention may be of any known type typically used in pneumatic valves such as an electromagnetic solenoid having a floating armature with lost-motion biasing such as described in prior art U.S. Pat. Nos. 4,438,418 or 3,538,954, the disclosures of which are incorporated herein by reference. Thus, those having ordinary skill in the art will appreciate from the description that follows that the exact form of the actuator, whether electromagnetic or otherwise, forms no part of the present invention. The valve body 12 is adapted to be mounted to a manifold, sub-base, or any of a number of various pneumatically actuated devices (not shown). It should be further appreciated from the description of the invention that follows that, although the preferred embodiment of the pneumatic valve assembly 10 of the present invention is depicted as a four-way valve, the present invention may also be alternately embodied in the form of a two-way valve, a three-way valve (as shown in FIG. 5), or the like.

Figure 2:
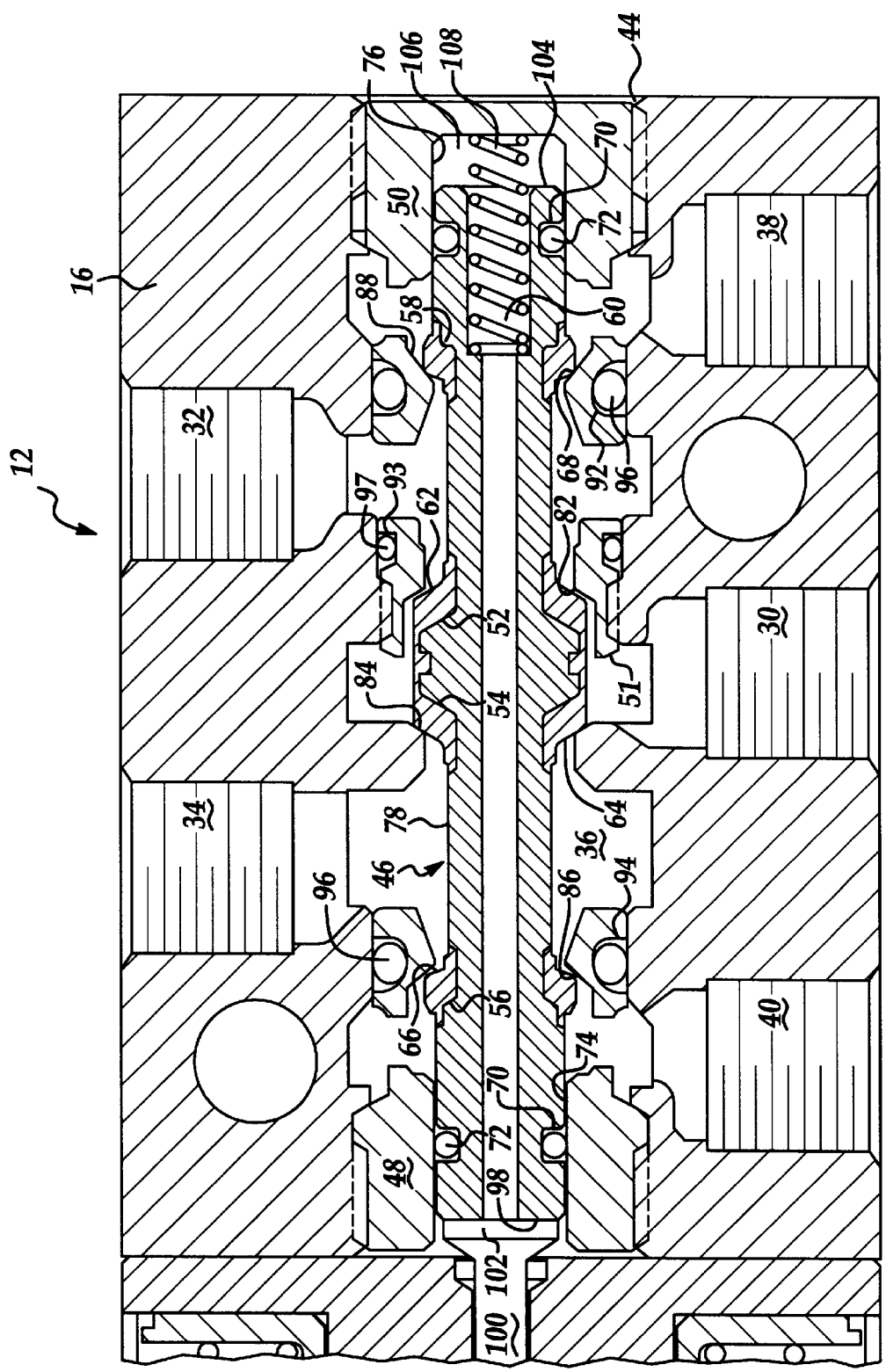
FIG. 2 is a cross-sectional side view of a valve assembly including the features of the present invention illustrating the position of the valve member when the solenoid is de-energized.
Figure 3:
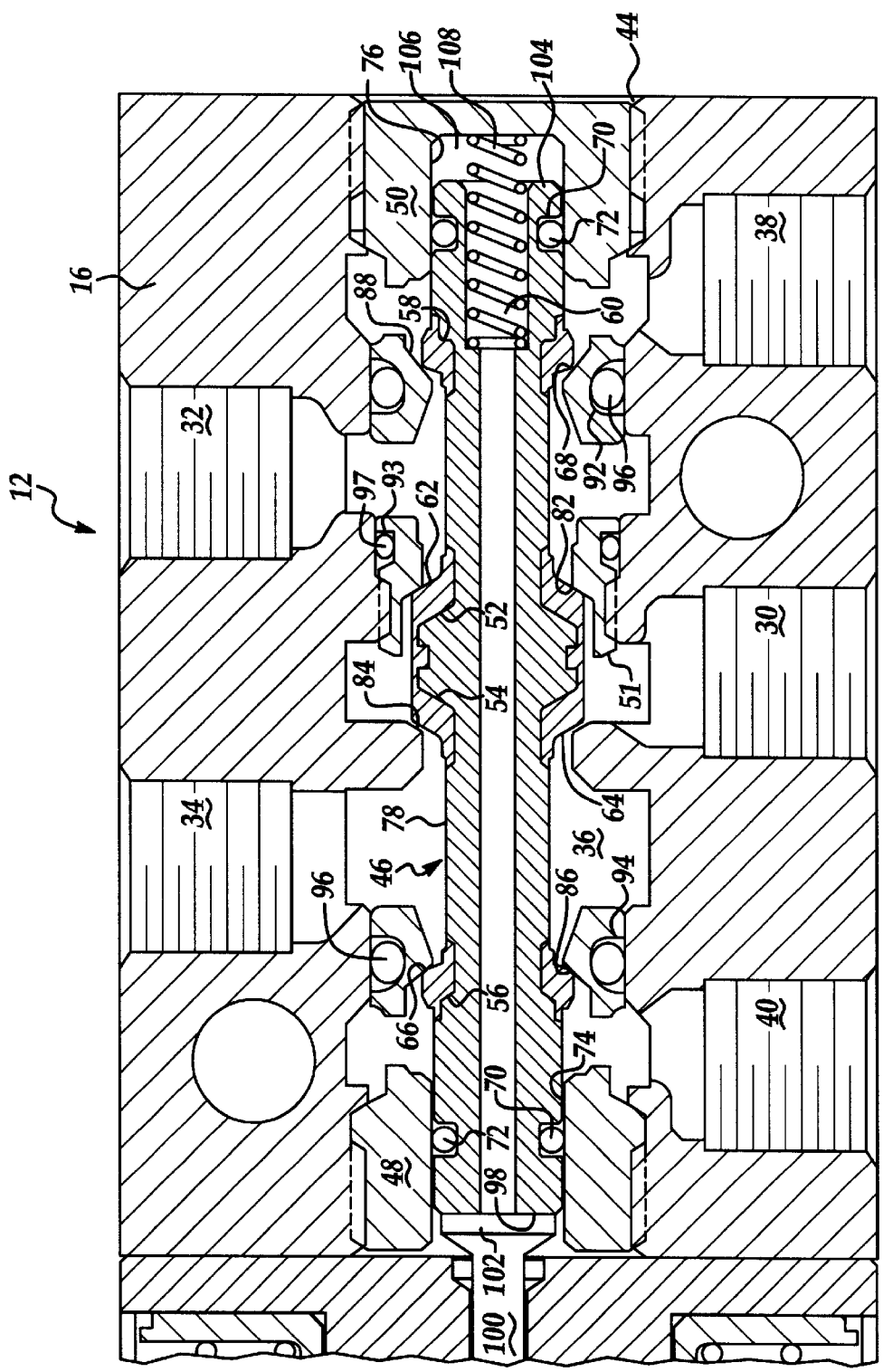
FIG. 3 is a cross-sectional side view of the valve assembly of the present invention illustrating the position of the valve member when the solenoid is energized.

Referring now to FIGS. 2 and 3, the valve body 12 includes a pressurized fluid inlet port 30 for communicating with a source of pressurized fluid, such as air. Furthermore, the valve body 12 includes at least one cylinder passage, or outlet port 32, that is adapted for fluid communication with one or more pneumatically actuated devices. A valve bore 36 extends axially through the valve body 12. In the embodiment illustrated here, the pneumatic valve assembly 10 is a four-way valve and includes a pair of outlet ports 32, 34 and a pair of exhaust ports 38, 40 each in fluid communication with the valve bore 36. The outlet ports 32, 34 are formed through the top surface 16 of the valve body 12 opposite the inlet port 30 and exhaust ports 38, 40, which are formed through the bottom surface 18. However, those having ordinary skill in the art will appreciate that the inlet port 30, outlet and exhaust ports 32, 34 and 38, 40, respectively, may be formed through the various surfaces of the valve body 12. For example, these ports may all be formed through one surface, such as the bottom 18 of the valve body 12, without departing from the scope of the invention. The inlet port 30, outlet and exhaust ports 32, 34 and 38, 40, respectively may also be threaded to accommodate any mechanism necessary to establish fluid communication with another element that is operatively associated with the valve assembly 10.

In the preferred embodiment illustrated in the figures, the valve bore 36 may extend completely through the valve body 12 to present a pair of open ends 42, 44. A valve member, generally indicated at 46, is movably supported within the valve bore 36 between predetermined positions to selectively direct a flow of pressurized air from the inlet port 30 through the valve bore 36 to at least one of the outlet ports 32, 34. Concomitantly, the valve member 46 may also selectively direct pressurized air to vent from at least one of the outlet ports 32, 34 to at least one of the exhaust ports 38, 40, as will be described in greater detail below. A pair of end retainer inserts, generally indicated at 48 and 50 are received in the pair of open ends 42, 44 of the valve body 12, thereby retaining the valve member 46 within the valve bore 36 as will be described in greater detail below. Similarly, the valve assembly 10 may include one or more inner retainers that are threadably positioned within the valve bore 36. In the embodiment illustrated herein, the valve assembly 10 includes one inner retainer 51 that is threadably positionable within the valve bore 36 as will be described in greater detail below.

The valve member 46 further includes at least one valve element 52 disposed along the valve member insert 78. In the specific embodiment illustrated in FIGS. 2 and 3, a plurality of valve elements 52, 54, 56, and 58 are formed on the valve member 46 and are each operable to selectively direct a flow of pressurized air from an inlet port 30 through the valve bore 36 to the respective outlet ports 38, 40. Some of the valve elements 52, 54 may have angular valve sealing surfaces 62, 64, respectively, for a purpose that will be described in greater detail below. Others, such as valve elements 56 and 58 may define corners which seal against angular valve seats and maybe of the type described in U.S. Pat. Nos. 4,438,418 or 3,538,954 mentioned above. As shown in FIGS. 2 and 3, the valve member 46 further includes annular grooves 70 that receive o-ring type seals 72, which slidingly engage the central bore openings 74, 76 respectively, of the retainer inserts 48, 50 to prevent leakage of the pressurized air within the valve bore 36.

Figure 4A:
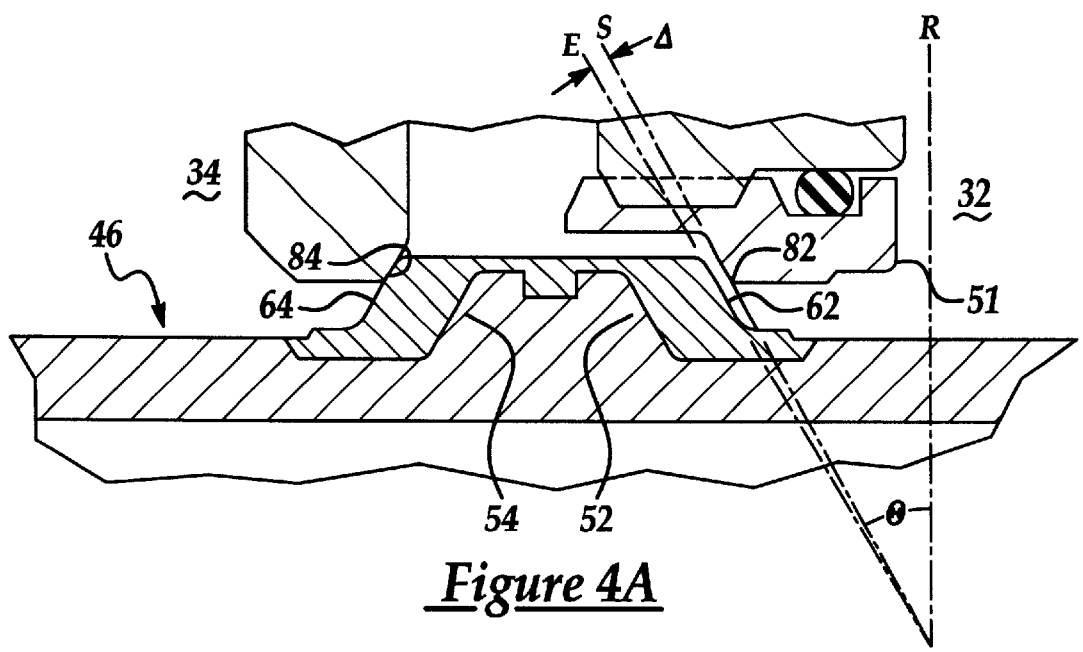
FIG. 4A is a partial cross-sectional side view in detail of the valve assembly of the present invention illustrating the valve sealing surfaces when the solenoid is de-energized.
Figure 4B:
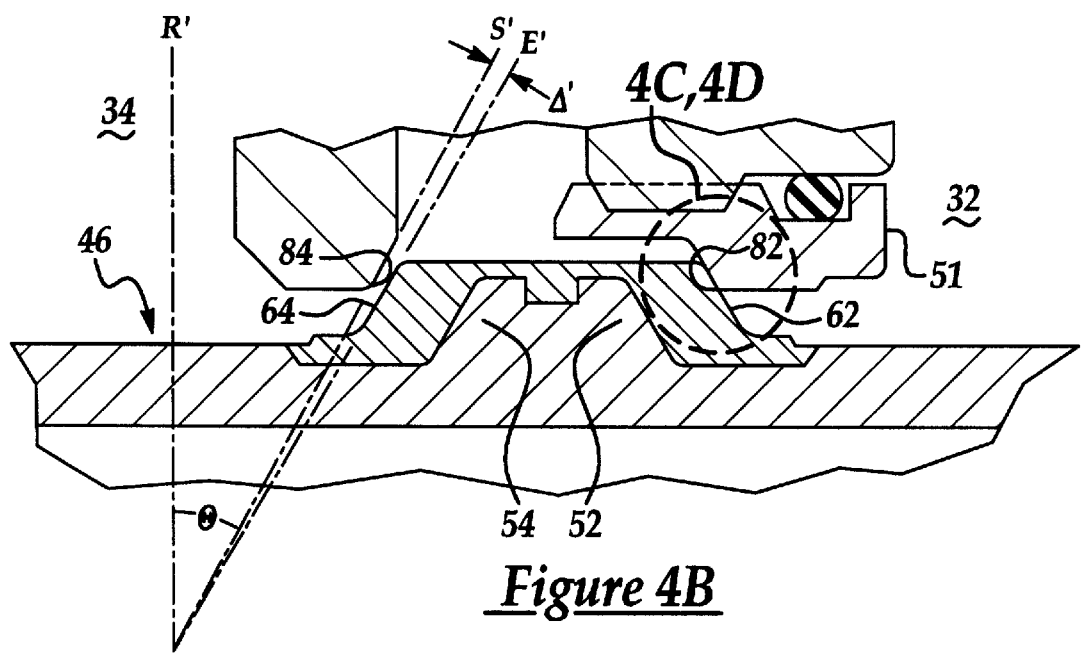
FIG. 4B is a partial cross-sectional side view in detail of the valve assembly of the present invention illustrating the valve sealing surfaces when the solenoid is energized.

The valve seats 82, 84, 86, and 88 cooperate with the valve elements 52, 54, 56, and 58, respectively, to seal the various passages in the valve body 12 as will be discussed in greater detail below. The valve seats 82, 84, 86, and 88 provide a sealing contact with the angular valve sealing surfaces 62, 64, 66, and 68 of the valve elements 52, 54, 56, and 58 when the valve member 46 is in a closed position, relative to a particular outlet port, thereby interrupting the flow of pressurized air to that port. As best shown in FIGS. 4A and 4B, at least some of the valve seats 82, 84 are formed with an oblique angle, relative to the valve member 46. The oblique angle of the valve seat of the preferred embodiment of the present invention is measured as the angle between the line of the surface of the valve seat and a radial line extending outward from the centerline of the valve member. In other words, in reference to valve seat 82 in FIG. 4A, the angle is depicted as "θ", which is measured between the line "S" of the surface of the valve seat 82 and a radial line "R" extending outward perpendicularly from the centerline of the valve member 46. In one preferred embodiment, the angle θ may range between 28 to 32 degrees. However, those having ordinary skill in the art will appreciate that this range may be greater or lesser than as noted above.

Figure 4C:
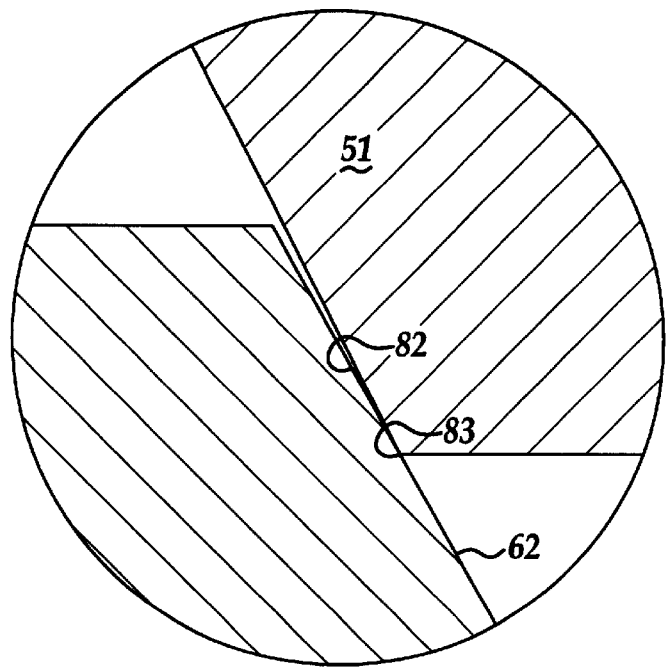
FIG. 4C is an enlarged partial cross-sectional side view showing the interaction of the valve seat with the valve element at the initial point of contact therebetween.
Figure 4D:
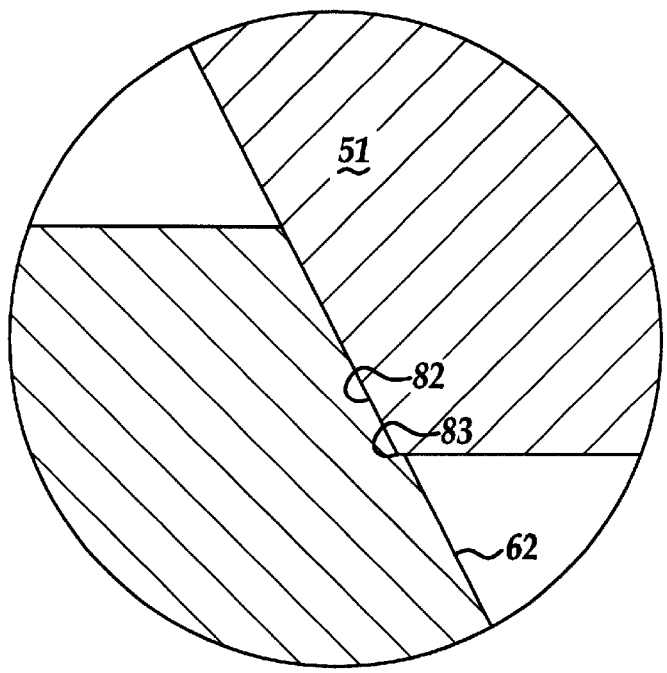
FIG. 4D is another enlarged partial cross-sectional side view illustrating the surface sealing contact between the valve seat and the valve element.

Correspondingly, the oblique angle of the valve seat is some degrees less than the angular measurement of the angular valve sealing surface. In other words, an angular difference, shown as "Δ", places the angular valve sealing surface 62 of the valve element 52 along a line "E", which is generally 2 to 3 degrees greater than the "θ" angle of valve seat 82. In one preferred embodiment, the angle A may range between 2 to 3 degrees. However, those having ordinary skill in the art will appreciate that this range may be greater or lesser than as noted above. In this way, a surface seal is established as the angular sealing surface contacts the valve seat, the seal being created axially along the angular plane of the surfaces. For example, when the valve member 46 moves to a closed position, as in FIGS. 4B, 4C, and 4D in regards to a particular outlet port 32, the angular valve sealing surface 62 sealingly contacts the respective valve seat 82 in such a manner so as to avoid or drastically reduce damage to the valve-sealing surface by the valve seat. More specifically, due to the angular difference between the valve-sealing surface 62 and its respective valve seat 82, contact between these two surfaces begins at the corner 83 of the valve seat 82. The force acting on the valve member causes this point contact to grow such that a surface seal is effected rather than a ring seal, which is typical in the related art. Additionally, this sealing arrangement can be seen in FIG. 4B with reference to the fixed valve seat 84 within the valve bore 36. In like manner to the above description, the angle "θ'" is depicted as the measurement of the angle between line "S'" of valve seat 84 and the radial line "R'". The angular valve seating surface 64 having an angular difference "Δ'". It should be appreciated by those having ordinary skill in the art that although the illustrations of the preferred embodiment show this type of valve sealing surface to valve seat interaction at each of the valve seats depicted, it is not necessary that all valve seats within the valve assembly employ this arrangement to stay within the scope of the invention.

In the preferred embodiment, the valve member 46 is an aluminum insert that is over-molded with a suitable resilient material such as rubber, or any known elastomer, in the appropriate places. More specifically, it should be appreciated by those having ordinary skill in the art that the material of the sealing surface may be made of any known composition that is slightly yielding, yet highly resilient, such as nitrile, which may be bonded, or over-molded to the valve element 46.

Of the plurality of valve seats 82, 84, 86, and 88 shown in FIGS. 2 and 3, some may be disposed directly in the valve bore 36 itself, as in the case of valve seat 84, while others may be disposed upon the end retainer inserts 48, 50 and inner retainer 51. The retainer inserts 48, 50, and 51 may be adjustably positioned within the valve bore 36 of the valve body 12, having a threadable interaction with the ends 42, 44 or any other suitable portion of the valve bore 36. As discussed above, each of the retainer inserts 48, 50 has a central bore 74, 76 that receives the valve member 46 and allows it to slidingly move within the valve body 12. Thus, the threadably set position of the end retainer inserts 48, 50 within the valve body 12 controls the sealing of the valve seats with a given force applied to the valve member 46. The end retainer inserts 48, 50 further include annular grooves 92 and 94 which receive o-ring type seals 96 to prevent leakage of the pressurized air within the valve bore 36. On the other hand, the positions to which the inner retainer insert 51 is threadably set defines the predetermined "open" and "closed" positions of the valve assembly 10 and thereby sets the stroke length of the valve member 46. And like the end retainer inserts, the inner retainer 51 may also include an annular groove 93 which is adapted to receive an o-ring type seal 97 so as to prevent leakage of the pressurized air within the valve bore 36.

In the preferred embodiment, the central bore 74 of retainer insert 48, which receives the end 98 of the valve member 46 also extends fully through the retainer allowing the actuator assembly 14 to engage and thereby actuate the valve member 46. As shown for illustration purposes only, this may be accomplished by the use of an actuator pushpin 100 having an enlarged head 102 that extends into the retainer insert 48 to engage and actuate the valve member 46. It should be appreciated by those of ordinary skill in the art that the specific actuating means used to provide motive force to the valve member 46 lies beyond the scope of the present invention. Accordingly, it should be further appreciated that any number of different types of actuating elements, rather than a push pin, may be employed based on the actuating means used.

At the opposite end 104 of the valve member 46, a cup-shaped recess 60 is disposed within the valve member 46. Further, retainer insert 50 is closed at one end forming a larger cup-shaped recess 106. A biasing member 108 is disposed between the cup-shaped recess 60 of the valve member 46 and the cup-shaped recess 106 of the retainer insert 48, thereby providing a biasing force to the valve member 46 in one direction. The biasing member 108 may be a coiled spring or the like. The actuator assembly 14, as previously mentioned, is used to selectively actuate the valve member 46 within the valve bore 36 in the direction opposite to the biasing force of the biasing member 108. In this manner, the actuator assembly 14 drives the valve member to the right, as shown in FIG. 3, and the biasing member 108 returns the valve member 46 to its original position (to the left, in FIG. 2) when the actuator assembly 14 is deactivated.

An additional non-limiting embodiment of the present invention is generally indicated at 112 in FIG. 5. More specifically, a three-way valve embodying the present invention is generally illustrated in this figure. The valve body 116 includes a pressurized fluid inlet port 130 for communicating with a source of pressurized air. The three-way valve is shown having one inlet port 130, an exhaust port 132, and an outlet port 134. For size considerations, the valve body is constructed such that exhaust port 132 is in fluid communication with the valve bore 136 but comes outward, toward the viewer through the sidewall and is thus shown in phantom. Additionally, while the embodiment illustrated in FIG. 5 does not employ retainer inserts as discussed above in regards to four-way valves, those having ordinary skill in the art will appreciate that retainer inserts could be used in a valve of this type. However, the valve bore 136 does include a valve member, generally indicated at 146, which is movable between predetermined positions within the valve bore 136 to selectively direct a flow of pressurized air from the inlet port 130 through the valve bore 136 to the outlet port 134 and direct pressurized air from the outlet port 134 to the exhaust port 132.

The valve member 146 further includes valve elements 152, 154 disposed along the valve stem 178, which has an angular valve sealing surfaces 162, 164. As in the embodiment illustrated in FIGS. 2 and 3, the valve member 146 is an aluminum insert that is over-molded with a suitable resilient material such as rubber, or any known elastomer, in the appropriate places. Additionally, as noted above, it should be appreciated by those having ordinary skill in the art that the material of the sealing surface may be made of any known composition that is slightly yielding, yet highly resilient, such as nitrile, which may be bonded, or over-molded to the valve elements 152, 154.

The valve seats 182, 184 provide a sealing contact with the angular valve sealing surfaces 162, 164 of the valve element 152, 154 when the valve member 146 is in a first position, thereby interrupting the flow of pressurized air from the inlet port 130 to the outlet port 134, but allowing flow from the outlet port 134 to the exhaust port 132. As in the embodiment discussed with respect to FIGS. 2–3, the valve seats 182, 184 are formed with an oblique angle, relative to the valve member. Thus, when the valve member 146 is in its first position, as shown in FIG. 5, the angular valve sealing surface 164 initially sealingly contacts the corner of the valve seat 184 with a line contact. However, forces acting on the valve member 46 cause a surface seal to be established between the valve seat 184 and the valve sealing surface. To effect the seal and in one possible embodiment, the angular sealing surface 164 of the valve element 146 is only 2 to 3 degrees greater than the corresponding angular measurement of the valve seat 184 such that the seal created lies axially along the angular plane of the surfaces. When the valve member moves to its second position (not shown), the seal between angular valve sealing surface 162 and the valve seat 182 opens and the seal between angular valve sealing surface 164 and valve seat 184 closes thereby allowing the flow of pressurized air from the inlet port 130 to the outlet port 134 and interrupting the flow of pressurized air from the outlet port 134 to the exhaust port 132.

The valve member 146 further includes annular grooves 170 that receive o-ring type seals 172, which slidingly engage the valve bore 136. In this embodiment, the actuator pushpin 200 may have an enlarged head 202 that engages and actuates the valve member 146 at its one end 198. At the opposite end 204 of the valve member 146, a cup-shaped recess 206 is disposed to receive a biasing member 208 between end 204 of valve member 146 and the valve body 116, thereby providing a biasing force to the valve member 146 in one direction. The biasing member 208 may be a coiled spring or the like. The actuator assembly 114, as previously mentioned, is used to selectively actuate the valve member 146 within the valve bore 130 in the direction opposite to the biasing force of the biasing member 208. In this manner, the actuator assembly 114 drives the valve member 146 to the right, and the biasing member 208 returns the valve member 146 to its original position (to the left, as shown here) when the actuator assembly 114 is deactivated.

OPERATION

Referring back to the four-way valve assembly 10 depicted in FIGS. 1 through 4D, the valve member 46 is operatively and selectively actuated within the valve body 16, causing the angular valve sealing surfaces 62, 64, 66, and 68 of the valve elements 52, 54, 56, and 58 to cooperatively interact with the valve seats 82, 84, 86, and 88 to selectively open or close fluid passages and direct the pressurized air flow within the valve body 16 in particular paths. Referring specifically, to FIG. 2, with the valve assembly 12 in a non-energized, or non-actuated state, valve seat 82 and angular valve sealing surface 62 of the valve element 52 are open allowing the pressurized air to be routed from the inlet port 30 to the outlet port 32. At the same time, valve seat 84 and angular valve sealing surface 64 of the valve element 54 are closed blocking fluid communication to exhaust port 40 or outlet port 34. Concurrently, due to the four-way construction of the illustrated valve assembly 12, the valve seat 86 and angular valve sealing surface 66 of the valve element 56 are open such that outlet port 34 is in fluid communication with the exhaust port 40, yet outlet port 40 and exhaust port 34 are isolated from the remainder of the valve assembly 12 as valve seat 84 and angular valve sealing surface 64 of the valve element 54 are closed. This allows any residual pressure remaining in outlet port 34 to be vented out exhaust port 40 without impacting the desired flow between the inlet port 30 and the outlet port 32. With no power to energize the actuating means, the biasing member 108 keeps the valve member 46 biased to the left, as illustrated.

When the valve assembly 10 is actuated, as shown in FIG. 3, the valve member 46 moves to the right, and a converse arrangement of the above-described flow passages is established. Specifically, the supplied, pressurized air again enters the valve body 12 via the valve inlet port 30 and flows into the valve bore 36. With the valve member 46 actuated to the right, the angular valve sealing surface 64 of the valve element 54 and the valve seat 84 have opened allowing the pressurized air to be routed from the inlet port 30 to the outlet port 34, while valve sealing surface 62 of valve element 52 and valve seat 82 have closed preventing the supplied, pressurized air from escaping out exhaust port 38 or into outlet port 32. Additionally, given the four-way construction of the illustrated valve assembly 16, the valve seat 88 and valve sealing surface 68 of the valve element 58 are open such that outlet port 32 is in fluid communication with the exhaust port 38, yet outlet port 32 and exhaust port 38 are isolated from the remainder of the valve assembly 16 since valve seat 82 and angular valve sealing surface 62 of the valve element 52 are closed. This allows any residual pressure remaining in outlet port 32 to be vented out exhaust port 38 without impacting the desired flow between the inlet port 30 and the outlet port 34. Therefore, in the activated state, the pressurized air is prevented from moving from the valve bore 36 to the outlet port 32 and any residual pressure remaining in outlet port 32 is vented to the exhaust port 38. With power supplied to energize the actuating means, the biasing force of biasing member 108 is overcome and the valve member 46 is held to the right, as illustrated.

Due to the angular interaction of the sealing surfaces 62, 64 with the valve seats 82, 84 the present invention provides an initial line contact between the valve seats 82, 84 and the sealing surfaces 62, 64. This initial contact provides a workable seal. However, and depending on how much force is applied to actuate the valve member 46, this line contact may change to a larger surface sealing contact that creates the desired seal without having a valve sealing surface that must rest against the edge, or corner, of a square faced valve seat. The angular surface-to-surface seal of the valve seat to the valve element in the present invention minimizes the deflection of the resilient material over-molded on the valve element as it interacts with the valve seat. Therefore, the wear that affects the conventional valve art by the sealing material being repetitively deformed and ultimately cut as the valve member moves to its seated position against the square valve seat during each and every valve closing event is eliminated. This also prevents the undesirable and damaging effects of valve stroke lengthening that occurs in conventional valve assemblies. Therefore, valve timing and accuracy is maintained and the system processes that the valve assembly of the present invention controls remains consistent and reliable. Additionally, valve leakage and particle introduction into the downstream pneumatic flow path caused by the deformation and cutting of the valve sealing material of a conventional valve assembly, is also eliminated. Thus, the present invention overcomes the disadvantages and drawbacks of the conventional valve assembly of the related art. From the foregoing description, those having ordinary skill in the art will appreciate that the construction of the valve seat and valve sealing surface on the valve element according to the present invention may be employed at one or more places in any given valve. However, it is not necessary, within the scope of the appended claims, to employ this structure at every interaction between a valve seat and a valve element in any given valve.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

I claim:

1. A pneumatic valve assembly comprising:
   a valve body having a pressurized air supply inlet port in fluid communication with a source of pressurized air;
   a valve bore extending axially within said valve body and a valve member movable between predetermined positions within said valve bore to selectively direct a flow of pressurized air from said inlet port through said valve bore to at least one outlet port;
   at least one valve element disposed upon said valve member, said at least one valve element being over-molded with a resilient material to provide an angular valve sealing surface; and
   at least one valve seat defined in said valve bore and formed at an angle oblique to said valve bore, said oblique angle measured relative to a radial line extending perpendicularly outward from the centerline of said valve member, such that said oblique angle is 2 to 3 degrees less than the corresponding angular measurement of said angular valve sealing surface, said valve sealing surface and said valve seat cooperating to form a surface seal such that said valve seat is in surface sealing contact with said valve sealing surface of said valve element when said valve member is in a closed position thereby interrupting said flow of pressurized air.

2. A pneumatic valve assembly as set forth in claim 1 wherein said oblique angle of said valve seat is measured as the angle between the line of the surface of said valve seat and a perpendicular radial extending outward from the centerline of said valve member, said angle is in a range between 28 to 32 degrees.

3. A pneumatic valve assembly as set forth in claim 1 further including an at least one exhaust port disposed within said valve body in fluid communication with said valve bore such that said valve element is further operable to selectively direct a flow of pressurized air from said at least one outlet port through said valve bore to said at least one exhaust port.

4. A pneumatic valve assembly as set forth in claim 1 further including a plurality of outlet ports disposed within said valve body in fluid communication with said valve bore.

5. A pneumatic valve assembly as set forth in claim 4 further including a plurality of valve elements disposed upon said valve member operable to selectively direct a flow of pressurized air from said inlet port through said valve bore to said plurality of outlet ports.

6. A pneumatic valve assembly as set forth in claim 5 further including a plurality of exhaust ports each disposed within said valve body in fluid communication with said valve bore such that said valve element is further operable to selectively direct a flow of pressurized air from each of said plurality of outlet ports through said valve bore to the respective exhaust port of said plurality of exhaust ports.

7. A pneumatic valve assembly as set forth in claim 1 wherein said valve bore extends through said valve body to present a pair of open ends in which at least one retainer insert is received in one of said pair of open ends of said valve body, said retainer inserts adapted to retain said valve member within said valve bore.

8. A pneumatic valve assembly as set forth in claim 7 wherein said at least one valve seat is disposed upon said retainer insert.

9. A pneumatic valve assembly as set forth in claim 8 further including a biasing member adapted to be disposed in a first end of said valve bore and between said valve member and said retainer insert thereby providing a biasing force to said valve member in one direction.

10. A pneumatic valve assembly as set forth in claim 9 whereas said biasing member is a coiled spring.

11. A pneumatic valve assembly as set forth in claim 9 further including an electromechanical actuator assembly disposed within said valve body so as to selectively actuate said valve member within said valve bore in a direction opposite to said biasing force of said biasing member.

12. A pneumatic valve assembly as set forth in claim 11 wherein said electromechanical actuator assembly includes a solenoid.

* * * * *

UNITED STATES PATENT AND TRADEMARK OFFICE
CERTIFICATE OF CORRECTION

PATENT NO. : 6,668,861 B2 Page 1 of 1
DATED : December 30, 2003
INVENTOR(S) : Kevin C. Williams It is certified that error appears in the above-identified patent and that said Letters Patent is hereby corrected as shown below:

Column 12,
Line 20, "disposed within" should be -- mounted to --.

Signed and Sealed this

Twenty-seventh Day of December, 2005

JON W. DUDAS
*Director of the United States Patent and Trademark Office*